(12) United States Patent
Daya et al.

(10) Patent No.: US 8,977,573 B2
(45) Date of Patent: Mar. 10, 2015

(54) SYSTEM AND METHOD FOR IDENTIFYING CUSTOMERS IN SOCIAL MEDIA

(75) Inventors: Ezra Daya, Petah-Tikvah (IL); Dimitri Volsky, Kfar-Saba (IL)

(73) Assignee: Nice-Systems Ltd., Ra'anana (IL)

( * ) Notice: Subject to any disclaimer, the term of this patent is extended or adjusted under 35 U.S.C. 154(b) by 0 days.

(21) Appl. No.: 13/409,514

(22) Filed: Mar. 1, 2012

(65) Prior Publication Data

US 2013/0232159 A1    Sep. 5, 2013

(51) Int. Cl.
*G06F 17/30* (2006.01)
*G06Q 50/00* (2012.01)

(52) U.S. Cl.
CPC .......... *G06F 17/30702* (2013.01); *G06Q 50/01* (2013.01)
USPC ........................................................ 705/319

(58) Field of Classification Search
CPC ........................... G06Q 50/01; G06F 17/30702
USPC ........................................................ 705/319
See application file for complete search history.

(56) References Cited

U.S. PATENT DOCUMENTS

| | | | |
|---|---|---|---|
| 5,535,256 A | 7/1996 | Maloney et al. | |
| 5,724,488 A * | 3/1998 | Prezioso | 706/52 |
| 6,346,952 B1 | 2/2002 | Shtivelman | |
| 6,721,416 B1 | 4/2004 | Farrell | |
| 6,741,697 B2 | 5/2004 | Benson et al. | |
| 6,748,072 B1 | 6/2004 | McGraw et al. | |
| 6,829,348 B1 | 12/2004 | Schroeder et al. | |
| 6,904,143 B1 | 6/2005 | Peterson et al. | |
| 6,922,466 B1 | 7/2005 | Peterson et al. | |
| 6,922,689 B2 | 7/2005 | Shtivelman | |
| 6,959,078 B1 | 10/2005 | Eilbacher et al. | |
| 6,970,554 B1 | 11/2005 | Peterson et al. | |
| 6,981,040 B1 | 12/2005 | Konig et al. | |
| 7,035,926 B1 | 4/2006 | Cohen et al. | |
| 7,165,105 B2 | 1/2007 | Reiner et al. | |
| 7,200,614 B2 | 4/2007 | Reid et al. | |
| 7,246,078 B2 | 7/2007 | Vincent | |
| 7,370,004 B1 | 5/2008 | Patel et al. | |

(Continued)

OTHER PUBLICATIONS

Meshing the Media, and Channels Read, Brendan Customer Inter@ction Solutions; Sep. 2010; 29, 4; ProQuest Central p. 10.*

(Continued)

*Primary Examiner* — Taelor Kim
*Assistant Examiner* — Jesse P Frumkin
(74) *Attorney, Agent, or Firm* — Pearl Cohen Zedek Latzer Baratz LLP

(57) ABSTRACT

A system and method for identifying an author of a social media interaction. A social media profile may be received for a user interacting in a social media interaction in a social media environment. The social media profile may include identification parameter(s) defining personal information registered to the user in the social media environment and content parameter(s) defining content of the user's social media interaction. For each of a plurality of customers registered in a contact center environment, a contact center profile may be received for the customer including identification parameter(s) defining personal information registered to the customer in the contact center environment and content parameter(s) defining content of the customer's past contact center interactions. The user's social media profile and customer's contact center profile may be compared to determine if the social media user and contact center customer have the same identity.

26 Claims, 7 Drawing Sheets

(56) References Cited

U.S. PATENT DOCUMENTS

| | | |
|---|---|---|
| 7,616,756 B2 | 11/2009 | Blackwood et al. |
| 7,644,134 B2 | 1/2010 | Cohen et al. |
| 7,844,504 B1 | 11/2010 | Flockhart et al. |
| 7,853,800 B2 | 12/2010 | Watson et al. |
| 7,949,574 B2 | 5/2011 | Patel et al. |
| 7,959,234 B2 | 6/2011 | Cameron |
| 7,962,551 B2 | 6/2011 | Mukundan et al. |
| 7,962,616 B2 | 6/2011 | Kupferman et al. |
| 8,255,971 B1 | 8/2012 | Webb et al. |
| 8,271,332 B2 | 9/2012 | Mesaros |
| 8,326,694 B2 | 12/2012 | Patel et al. |
| 8,352,396 B2 | 1/2013 | Forman et al. |
| 8,396,834 B2 | 3/2013 | Bahadori et al. |
| 8,408,061 B2 | 4/2013 | Thomas |
| 2002/0083167 A1 | 6/2002 | Costigan et al. |
| 2002/0087385 A1 | 7/2002 | Vincent |
| 2007/0208682 A1 | 9/2007 | Mancisidor et al. |
| 2010/0027778 A1* | 2/2010 | Kumar et al. ............ 379/265.09 |
| 2010/0057772 A1* | 3/2010 | Manolescu et al. ....... 707/103 R |
| 2010/0153175 A1* | 6/2010 | Pearson et al. .................. 705/10 |
| 2010/0169159 A1* | 7/2010 | Rose et al. ....................... 705/10 |
| 2010/0250676 A1* | 9/2010 | Ufford et al. ................. 709/204 |
| 2010/0293560 A1* | 11/2010 | Bland et al. .................... 719/328 |
| 2011/0072052 A1* | 3/2011 | Skarin et al. .................. 707/794 |
| 2011/0125826 A1* | 5/2011 | Erhart et al. ................... 709/202 |
| 2011/0184905 A1 | 7/2011 | Phillips et al. |
| 2011/0252150 A1 | 10/2011 | Chandrabasu et al. |
| 2011/0274257 A1* | 11/2011 | Vaananen ................... 379/93.01 |
| 2012/0130809 A1* | 5/2012 | Tedjamulia et al. ........ 705/14.53 |
| 2012/0130861 A1* | 5/2012 | Tedjamulia et al. ......... 705/27.1 |
| 2012/0159647 A1* | 6/2012 | Sanin et al. ...................... 726/28 |
| 2012/0166345 A1* | 6/2012 | Klemm .......................... 705/304 |
| 2012/0195422 A1* | 8/2012 | Famous ................... 379/265.09 |
| 2012/0197907 A1* | 8/2012 | Malyshev et al. ............. 707/749 |
| 2012/0209605 A1* | 8/2012 | Hurvitz et al. ................ 704/235 |
| 2012/0303598 A1 | 11/2012 | Newnham et al. |
| 2012/0303621 A1 | 11/2012 | Newnham et al. |
| 2012/0303659 A1* | 11/2012 | Erhart et al. .................. 707/769 |
| 2013/0006874 A1 | 1/2013 | Klemm |
| 2013/0024405 A1 | 1/2013 | Newnham et al. |
| 2013/0051544 A1* | 2/2013 | Ross et al. ................ 379/265.02 |
| 2013/0080358 A1 | 3/2013 | Newnham et al. |
| 2013/0080377 A1 | 3/2013 | Newnham et al. |
| 2013/0110750 A1 | 5/2013 | Newnham et al. |
| 2013/0136253 A1 | 5/2013 | Liberman Ben-Ami et al. |
| 2013/0179440 A1* | 7/2013 | Gordon ........................ 707/731 |
| 2013/0185191 A1 | 7/2013 | Cohen |
| 2013/0218947 A1 | 8/2013 | Zur et al. |

OTHER PUBLICATIONS

Office Action for U.S. Appl. No. 13/400,850 dated Mar. 28, 2014.
Final Office Action for U.S. Appl. No. 13/400,850 dated Oct. 28, 2014.
Final Office Action for U.S. Appl. No. 13/305,279 dated May 23, 2013.
Notice of Allowance for U.S. Appl. No. 13/305,279 dated Nov. 7, 2014.
Office Action for U.S. Appl. No. 13/305,279 dated Jun. 6, 2014.
Office Action for U.S. Appl. No. 13/305,279 dated Jan. 17, 2013.

* cited by examiner

SYSTEM AND METHOD FOR IDENTIFYING CUSTOMERS IN SOCIAL MEDIA

FIELD OF THE INVENTION

Embodiments of the invention relate to systems and methods for monitoring social media channels in a contact center environment. Embodiments of the invention may analyze social media channels using techniques, such as, machine learning, pattern analysis, information retrieval, discourse analysis and topic modeling.

BACKGROUND OF THE INVENTION

Contact centers may enable company agents to interact with customers via multiple channels of communication, such as, text messaging, short message service (SMS) messaging, electronic mail (e-mail) messaging and telephone channels. However, many customers only interact with contact centers after a problem escalates, for example, as a last resort. Before interacting with a contact center, customers often turn to peers or other people to discuss their issues over social media channels, such as, message boards, web-logs (blogs) or micro-blogs, such as, Facebook and Twitter, outside of the contact center environment. Current contact centers have no way to identify authorship of social media posts or interactions that occur outside of their contact center environment and therefore cannot benefit from the connection of this valuable social media information to traditional interaction channels.

SUMMARY

Some embodiments of the invention provide a system and method for identifying an author of a social media interaction. A social media profile may be received for a user interacting in a social media interaction in a social media environment. The social media profile may include identification parameter(s) defining personal information registered to the user in the social media environment and content parameter(s) defining content of the user's social media interaction. For each of a plurality of customers registered in a contact center environment, a contact center profile may be received for the customer including identification parameter(s) defining personal information registered to the customer in the contact center environment and content parameter(s) defining content of the customer's past contact center interactions. The user's social media profile and customer's contact center profile may be compared to determine if the social media user and contact center customer have the same identity.

Some embodiments of the invention provide a system and method for determining if an author of a social media interaction is one of a plurality of customers. Identification information may be received that is registered by the author of the social media interaction that is publicly available. The author's received identification information may include a channel-specific identifier associated with a social media channel and the identification information registered for the plurality of customers may include a channel-specific identifier associated with a different communication channel. Embodiments of the invention may determine if the author of the social media interaction is one of the plurality of customers based on the similarities between the author's and user's respective identification information and content information describing the content of the author's social media interaction and content information describing the content of the customer's past interactions.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
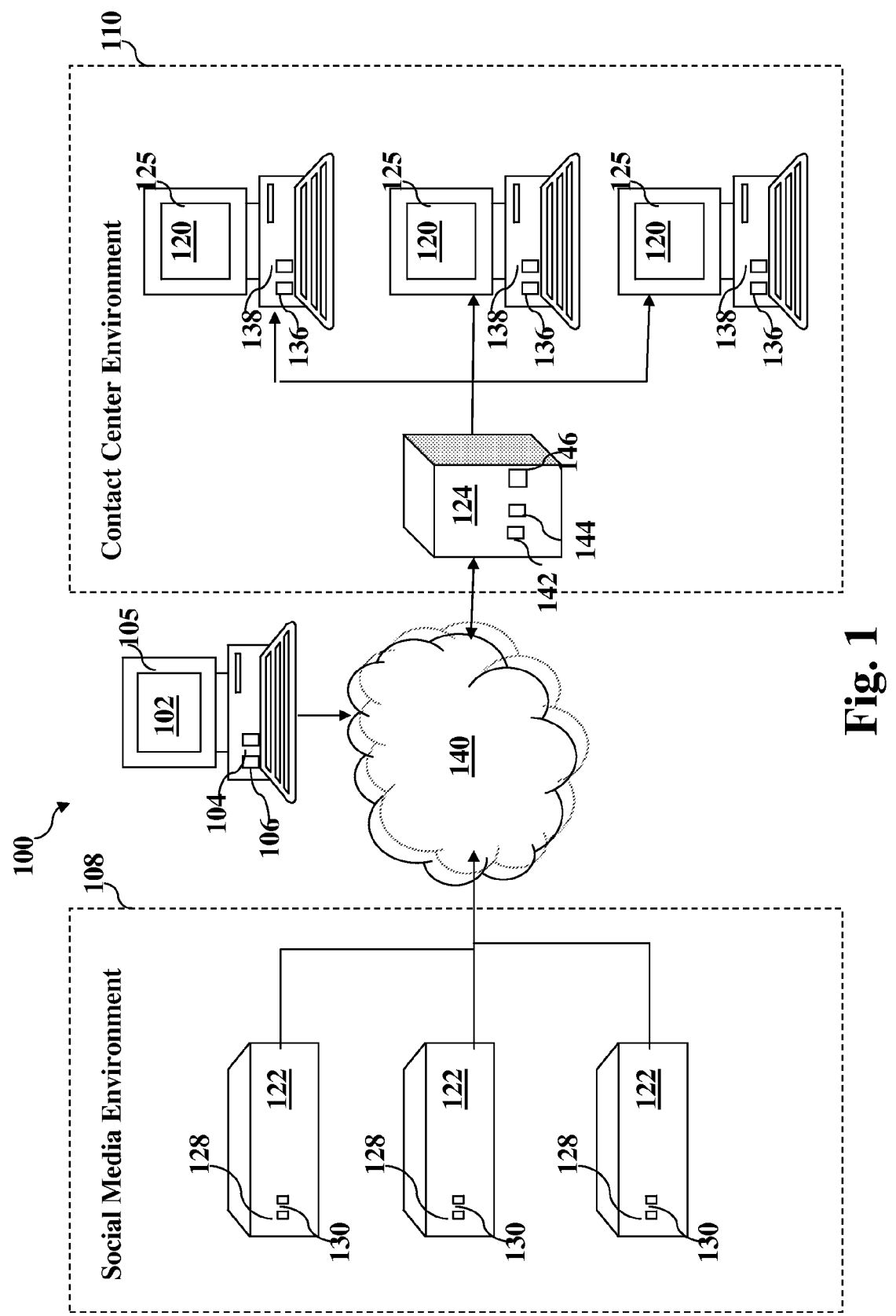
FIG. 1 schematically illustrates a system for monitoring a customer's social media interactions in accordance with an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

When used herein, a social media "post" or "interaction" may refer to any activity or entry of content over a social media channel, for example, via voice, text, video, links to other webpage content, or by simply selecting a field, such as, to "like" or "accept a friend request" in Facebook, subscribing to a blog or signing up for tweets on Twitter. In addition to these active posts, posts or interactions may also be passive, such as, having an advertisement displayed in the user's social media account, receiving another author's post, automatic log-outs, automatic counters tracking behavior such as most recent post, etc. Similarly, a contact center "interaction" may include any communication between a customer and a live or automated contact center agent or device, which may be initiated by either party.

Embodiments of the invention may monitor social media channels, which occur outside of the contact center environment, to supplement other traditional contact center channels, such as, telephone and Internet, to provide a more complete view of customers' experiences. When used herein, interactions that occur outside of the contact center environment may include customer interactions with one or more parties or accounts not affiliated with the contact center, over communication channels not registered to the contact center, hosted at servers not owned or operated by or on behalf of the contact center, and using user identification types such as usernames or pseudonyms that differ from identification types registered to customers in the contact center environment.

Monitoring social media interactions may allow contact centers to obtain customer experience information before the customer issue escalates or the customer communicates with the contact center. Furthermore, social media channels may provide unique access to a customer's honest and uncensored communication. The anonymity and wide audience of social media typically allows users to communicate more freely and with less fear of offending, than in direct communication with contact center agents. Accordingly, social media information may allow agents to gain a true understanding of a customer's uncensored perspective.

To retrieve social media posts, embodiments of the invention may probe social media channels using social media application programming interfaces (APIs), data provided by third party data compilers or directly using web crawlers to probe blogs, forums and web sites. Other probes may be used. The probe may use any type of search filter to sort or identify posts based on any criteria, such as, related to a company, product or topic, having certain keywords or terms in the post, etc.

Once the probe extracts social media posts, it may be difficult to identify the authors of the posts. For example, each social media service may store different types of user information than the contact center, users may use pseudonyms, user names or nicknames inconsistent with names registered or recorded at the contact center, user information may become outdated over time, availability of user information may be limited by privacy settings, etc. Accordingly, to accurately identify the author of social media posts, embodiments of the invention may go beyond simply matching user data. When used herein, a user may register with an organization such as a social media organization or a customer may register with an organization such as a contact center, for example, by signing up with the organization or having an account with the organization, and thus the organization may store information associated with the user or customer.

To identify if a user of social media is a registered customer in a contact center or with another entity, embodiments of the invention may consider a combination of factors, including not only identification information (which may vary) but also the content of the social media post (the user's style, topic, tone, etc.). In some embodiments, the user's identifying information may be compared using a "fuzzy" match criterion, which recognizes not only exact matching terms, but also similar (though not exactly matching) terms. In one example, "A_Smith," "Aaron Smith" and "A. E. Smith" may match under a fuzzy match criterion.

An equivalence relation may be used to compare the combination of factors between the user's social media profile and the customer's contact center profile. The equivalence relation may score each factor and combine the factors as a weighted (or non-weighted) sum to determine a final equivalence or confidence score. If the confidence score exceeds a predetermined threshold, the social media user and contact center customer may be linked or deemed as equivalent entities. The predetermined threshold may define a level of exactness required for a match and may be fixed or changeable. The predetermined threshold may be set during a testing phase based on previously verified matches, for example, to balance maximizing the accuracy of matches while minimizing missed matches. If no customers are found to match a social media user, the user's post may be deleted. Alternatively, the user's post may be saved for a predetermined amount of time, to retroactively be matched if the user registers or signs up as a customer within that time. Ideally, at most one customer may match each user. If, however, more than one customer matches a user, the threshold may be automatically refined to allow only the highest scoring customer to match (e.g., if the confidence scores are sufficiently different, such as by greater than 10%, to clearly favor the highest scoring customer) or, alternatively, no match is made. In some embodiments, an additional verification step may be used for a contact center agent or administrator to verify the match. If the equivalence relation defines a match, the social media user and contact center customer may be linked as equivalent. Once linked, the contact center may add that user's social media posts as a channel of communication to be monitored for the associated customer.

The content of the social media post may be automatically analyzed to determine the subject or issue of the post, for example, to generate or retrieve pre-generated solutions, insights, sale-offers, promotions, etc., to prompt the agent to communicate to the customer. The content of the social media post may further be analyzed to determine the author's tone, or the emotional content of the communication, for example, to determine the urgency of the issue and provide a response proportional to that urgency, to prepare or warn an agent (especially when communicating with hostile or upset customers) so that the agent may best handle social aspects of interacting with that customer, etc.

Once alerted that there is a relevant social media post, a contact center agent may resolve the issue within the social media environment or within contact center environment. In the social media environment, the agent may use a company account (e.g., the company for which the agent works) registered to the social media service to communicate directly with customers within or via the social media environment, thereby reducing the volume of communications in the contact center environment. In the contact center environment, the social media information may be used to inform and prepare the agent to better anticipate the customer's needs. Since the customer's issues are already known by the time they interact with the contact center, the contact center agent may be automatically prompted with such information and/or solutions to efficiently handle customer issues. In some embodiments, contact center agents may take pro-active steps to initiate contact with the customer when an issue is raised outside of the contact center environment or, alternatively, may wait for the customer to initiate contact.

Social media interactions may be tracked in real-time, for example, while the user is communicating in the social media environment or at a small time delay thereafter (e.g., on the order or a few second).

Agents may include real-life interactive personnel, automated computer agents, avatars, voice or text prompts, etc., or a combination semi-live/semi-automated agent.

Reference is made to FIG. 1, which schematically illustrates a system 100 for monitoring a customer's social media interactions in accordance with embodiments of the invention.

System 100 may include one or more user devices 102. Customers or users may operate user devices 102 to interact over one or more communication channels via one or more networks 140 (e.g. such as the Internet, chat or telephone networks). User devices 102 may include computers (for web or Internet connections), telephones (for telephone or radio network connections), or messaging or text enabled devices (for messaging network connections).

User devices 102 may connect to a social media environment 108 or a contact center environment 110. Contact center environment 110 may be hosted or operated by a contact/interaction center 124 to provide support for a target company or entity and interact with customers on the target company's behalf. While environment 110 separate from a social media environment in which it is desired to "pair" or match customers to social media users includes in one embodiment a contact/interaction center 124, in other embodiments, contact center environment 110 may be hosted or operated by an entity other than a contact center, such as the target company or entity itself, a research group, user devices 102, etc. In contrast to contact center environment 110, social media environment 108 may not be hosted by the target company and may have no direct affiliation with the target company, although the target company may be discussed in social media forums, advertise on social media sites, and the target company (or its representative) may itself be a social media user. When used herein, "customers" of the target company may be registered in contact center environment 110 and "users" of social media or "authors" of social media posts may be registered in social media environment 108.

In contact center environment 110, customers may interact with live (e.g. human) or automated (e.g. computer generated or operated) agents for example operating or being executed by agent devices 120 in an interaction center 124. Interactions center 124 may operate or execute call centers (for telephone-based support) and/or online support forums (for Internet-based support) to automatically connect user devices 102 to agent devices 120. Agents operating agent devices 120 may provide customers with customer support, conduct transactions for purchasing products or services, fill out surveys or polls, conduct marketing analysis, update data records, or provide other products or services. Agent devices 120 may include the same or different device(s) as user devices 102, such as, computers, telephones, cellular devices, and/or messaging devices.

In social media environment 108, users may interact over a social media platform provided by social media servers 122. Social media servers 122 may provide any type of social media technology including, for example, web-logs (blogs), video blogs (vlogs), microblogs, wikis, podcasts, instant messages, etc. Social media servers 122 may be operated by providers such as, Facebook, Twitter, Wikipedia, YouTube, etc. Users of social media environment 108 may write or author social media posts relevant to the target company, for example, discussing problems or solutions for resolving technical issues, providing company feedback, recommendations or criticisms for products or services, etc. Information shared in social media environment 108 may be unique and distinct from information provided in contact center environment 110. For example, social media interactions may occur at a relatively earlier stage of problem escalation and typically encourage a relatively more open form of communication.

To obtain this valuable information, interaction center 124 may include a probe 146 to search for interactions in social media environment 108 that relate to the target company or entity. Probe 146 may include social media APIs (e.g., specific to each social media host or server 122), a link to a third party data compiler or web crawlers, to probe blogs, forums and web sites hosted by social media servers 122. Probe 146 may use any suitable type of search filter to identify and extract posts based on any suitable criteria.

To, for example, provide customer-specific support (or for other reasons), interaction center 124 may determine if the author of each post in social media environment 108 is the same entity (e.g., the same person) as a customer registered in or signed up with contact center environment 110. Since the same entity may have different identifying information or different types or forms of identifying information available in the different environments 108 and 110, interaction center 124 may use an equivalence relation weighing a combination of factors to determine if the social media user that authors a post is equivalent to the customer. The equivalence relation may compare identification information respectively registered to or associated with the user and the customer in their respective environments 108 and 110 (which may differ) and may also compare content in the user's social media post to content associated with the customer in contact center environment 110. Identification information may include username or user identifier (ID), legal name, age, date of birth, place of residence, occupation, etc. Content may include, for example, the substance of social media posts or interactions (e.g., the actual text, data or other information), or derivations or metatdata from these posts, such as for example subject or topic, sentiment or emotion—e.g., one of a predetermined group of emotional or sentiment states, tone, opinion, style, vocabulary, the presence of certain keywords, average length of sentences, unique phrases, slang and emoticons. Using the equivalence relationship that weighs both identifying information and content information, interaction center 124 may determine whether or not the social media user and contact center customer match. The match may define an exact or approximate (fuzzy) equivalence. If a match is determined, interaction center 124 may add the user's social media post and/or all of the user's future relevant posts as a channel of communication (e.g., from social media server 122) to be monitored for the equivalent customer. In other contexts, e.g., where an organization performing matching is not a contact center, other further actions may occur.

User device 102, agent devices 120, social media servers 122 and interaction center 124 may each include one or more controller(s) or processor(s) 106, 136, 128, and 142, respectively, for executing operations and one or more memory unit(s) 104, 138, 130 and 144, respectively, for storing data and/or instructions (e.g., software) executable by a processor. Processor(s) 106, 136, 128 and 142 may include, for example, a central processing unit (CPU), a digital signal processor (DSP), a microprocessor, a controller, a chip, a microchip, an integrated circuit (IC), or any other suitable multi-purpose or specific processor or controller. Memory unit(s) 104, 138, 130 and 144 may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units. User device 102 and agent device 120 may include one or more input devices, for receiving input from a user or agent (e.g., via a pointing device, click-wheel or mouse, keys, touch screen, recorder/microphone, other input components) and output devices 105 and 125 (e.g., a monitor, display or screen) for displaying data to a user/customer and agent, respectively.

User device 102, agent devices 120, social media servers 122 and interaction center 124 may each be or include, for example, software executed on one or more processors, and while this software may be in one processing device or server, it is not necessarily executed by the same processor or within the same computing device.

Figure 2:
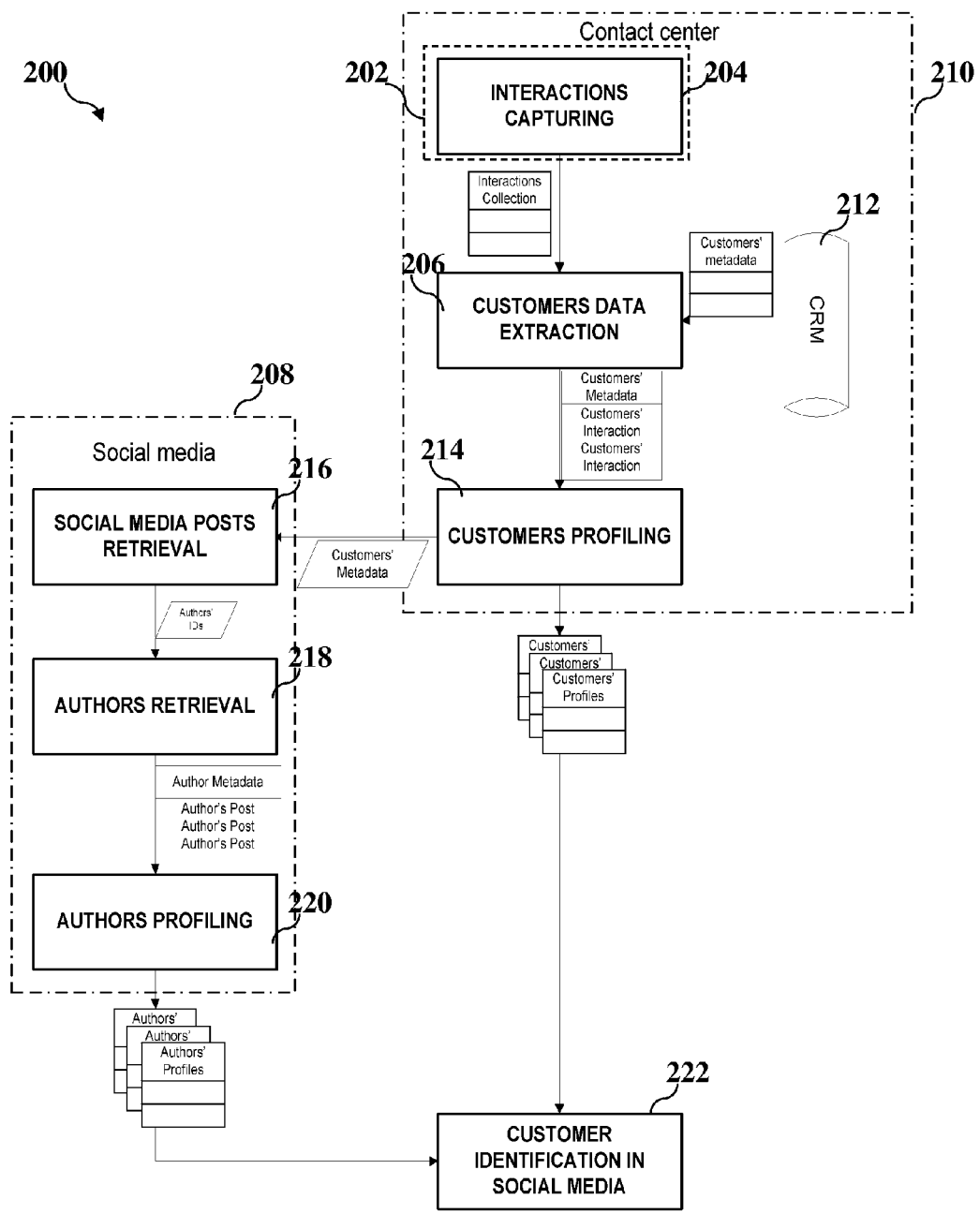
FIG. 2 schematically illustrates a system for generating data used to monitor a customer's social media interactions in accordance with embodiments of the invention.

Reference is made to FIG. 2, which schematically illustrates a system 200 for generating data used to monitor a customer's social media interactions in accordance with embodiments of the invention.

System 200 includes a social media environment 208 (e.g., social media environment 108 of FIG. 1) and a contact center environment 210 (e.g., contact center environment 110 of FIG. 1).

Contact center environment 210 may include a capture module 202 (e.g., a software or hardware module in interaction center 124 or agent device 120 of FIG. 1) that captures interactions 204 between a user device (e.g., user device 102 of FIG. 1 operated by a targeted customer) and an agent device (e.g., agent device 120 of FIG. 1 operated by a company agent). Captured interactions 204 may include, for example, voice interactions, chat interactions, e-mail messages, SMS messages, etc. Capture module 202 may extract customer data 206 from each interaction 204 according to predefined rules for each channel of communication, for example, as follows.

For channels supporting chat interactions, customer data 206 may be extracted that includes a customer name and/or account ID, for example, as provided by the customer in an identification process or log-in stage.

For audio or voice channels, customer data 206 may be extracted that includes a customer ID, for example, as provided during an identification process and extracted using session keyword spotting. Alternatively, customer data 206 may be extracted by taking a screen shot of an agent's workstation once the agent enters the information.

For e-mail messaging channels, customer data 206 may be extracted that includes the customer's e-mail address or identification inside the e-mail message, for example, following a valediction.

For Internet or Web channels, customer data 206 may be extracted that includes site registration information or internet protocol (IP) addresses.

To identify the interacting customer, extracted customer data 206 may be compared to identification information registered to or associated with contact center customers, for example, stored in a customer information database 212, such as, a customer relationship management (CRM) database. In one embodiment, database 212 may store customer information separately for each channel (e.g., telephone numbers for a telephone channel, usernames or customer IDs for an Internet channel, etc.). Each customer entity may be correlated in database 212 with a unique system ID to identify their interactions over all channels. If the extracted customer data 206 matches the identification information registered to the customer for the corresponding channel in database 212, the correlated customer entity may be identified as the customer of the interaction and their unique system ID may be attached or assigned to the interaction, for example, as customer metadata.

Once the customer is identified, a customer profile 214 may be generated or received that includes the identification information registered to the customer in contact center environment 210, as well as content information detailing the content of the customer's interactions 204. Customer profile 214 defining interaction content and personal identification details of a customer in contact center environment 210 may be compared with an author profile 220 defining post content and identification information of an author in social media environment 208.

To search for the target customer's social media posts, social media environment 208 may search or filter social media posts 216 to retrieve posts 216 that have authorship information that substantially matches customer metadata for the target customer or, alternatively, may be unfiltered for indiscriminately analyzing all posts. Author data 218 (e.g., an author ID) may be extracted from each post 216 identifying an author of the post. An author profile 220 may be generated or received for the author that includes the identification information registered to or associated with the author in social media environment 208, as well as content information detailing the content of the social media posts 216.

Customer profile 214 and author profile 220 may be compared to determine if the customer and the author are the same entity. If so, author's data 218 may be added to the customer's identifying information in customer database 212 and/or the author's posts may be added as a social media channel in contact center environment 210. Contact center environment 210 may use author's data 218 to stream all of the author's posts over time from social media environment 208, or only a sub-set of those posts, e.g., that meet criteria, such as, related to a target company, within a recent period of time, etc. If the comparison of profiles 214 and 220 shows that the customer and author are not the same entity, the comparison may be refined, e.g., by updating information or requiring a less exact match, or the customer and author may be determined to be different entities.

This cross-environment analysis may incorporate a social media channel (from social media environment 208) into a group of traditional channels, such as, telephone, web, e-mail messaging, etc. (in contact center environment 210). In one example, contact center agents may use the social media channel to identify customer comments before the customers communicate with contact center environment 210 or issues escalate. Agents may respond to customer comments via contact center environment 210, e.g., initiating a call with the customer, or via social media environment 208, e.g., responding to their posts as another social media user. In one example, agents may use social media environment 208 to encourage customers to solve their issues over the social media channel to reduce contact center communications. Alternatively, agents may wait until customers communicate with contact center environment 210 to handle customer issues.

Figure 3:
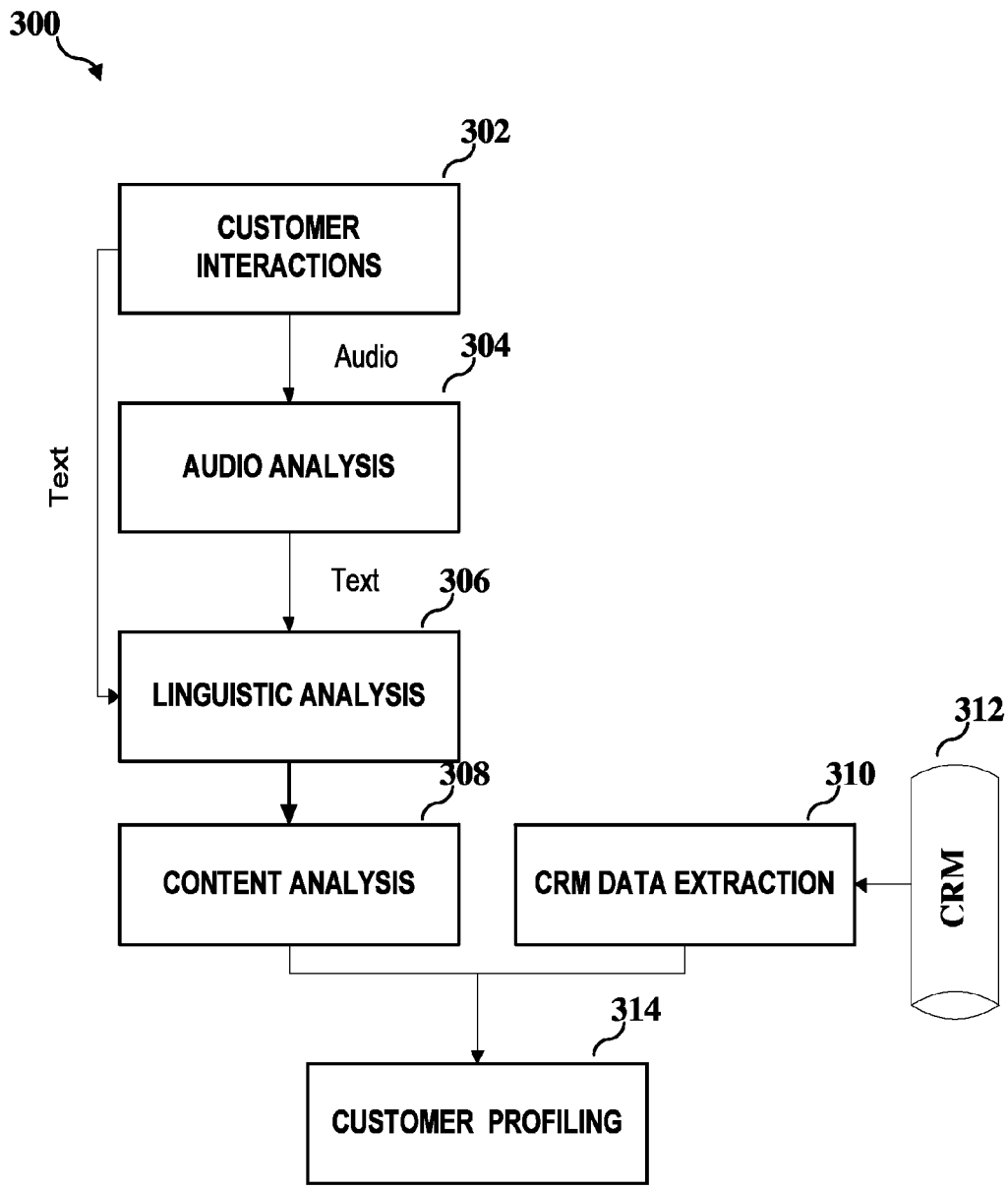
FIG. 3 is a workflow of a method for generating a customer's contact center profile in accordance with embodiments of the invention.

Reference is made to FIG. 3, which is a workflow 300 of a method for generating a customer's contact center or other organization profile in accordance with embodiments of the invention. In one embodiment, a customer's contact center or other company profile (e.g., customer profile 214 of FIG. 2) is a collection of data describing a person's use of and/or identity associated with a contact center (e.g., interaction center 124 of FIG. 1) or other platform or service.

In operation 302, a processor (e.g., contact center processor 142 of FIG. 1) may receive interactions for each customer captured over one or more communication channels in a contact center environment (e.g., contact center environment 110 of FIG. 1). When audio or voice data is received, e.g., over telephone or computer telephony integration (CTI) channels, a process or processor may proceed to operation 304, while when text or visual data is received, a process or processor may proceed directly to operation 306 (e.g., skipping operation 304). In some embodiments, both audio and text data may be received, e.g., via video media, in which case the data may be divided and each type of data may be processed separately.

In operation 304, an audio analysis module (e.g., hardware or software executed by contact center processor 142 of FIG. 1) may perform an audio analysis on the received audio data. The audio analysis module may include logic or analysis engines to perform tasks, such as, speech-to-text conversion, word spotting, emotion analysis, call flow analysis (e.g., numbers of transfers, holds, etc.), talk analysis (e.g., durations of talking, silence, etc.), and any other operations for analyzing, comprehending and predicting the content and meaning of audio data.

In operation 306, a linguistic analysis module (e.g., hardware or software executed by contact center processor 142 of FIG. 1) may perform linguistic analysis on text data (captured directly or converted from audio data in operation 304). The linguistic analysis module may include logic or analysis engines to perform linguistic tasks, such as, automatic transcription of calls, e-mail messages and chats, parts-of-speech (POS) tagging, stemming, and extracting syntactic phrases such as noun phrases, verb phrases, etc. The linguistic analysis module may use POS tagging to assign a particular part of speech such as a noun, verb or preposition to one or more words in a text, for example, based on the word's definition and context. The linguistic analysis module may use word stemming to reduce inflected or derived words to their base forms, for example, a single form for nouns, a present tense for verbs, etc. The stemmed word may be the written form of the word. In some embodiments, stem words may be used for further processing instead of the original word from the text, in order to broaden the linguistic analysis. POS tagging and word stemming may be performed, for example, using LinguistxPlatform™ software manufactured by SAP AG of Waldorf, Germany, although other software may be used.

In operation 308, a content analysis module (e.g., hardware or software executed by contact center processor 142 of FIG. 1) may analyze the content of interactions (e.g., via text captured directly or linguistically analyzed in operation 306) to extract features that may be used to build the customer profile. The content analysis module may include logic or analysis engines to perform tasks, such as, phrase analysis, style analysis and customer details extraction. For phrase analysis, the content analysis module may extract topics from customer interactions. Phrase analysis may be executed, for example, as described in reference to FIG. 4.

Figure 4:
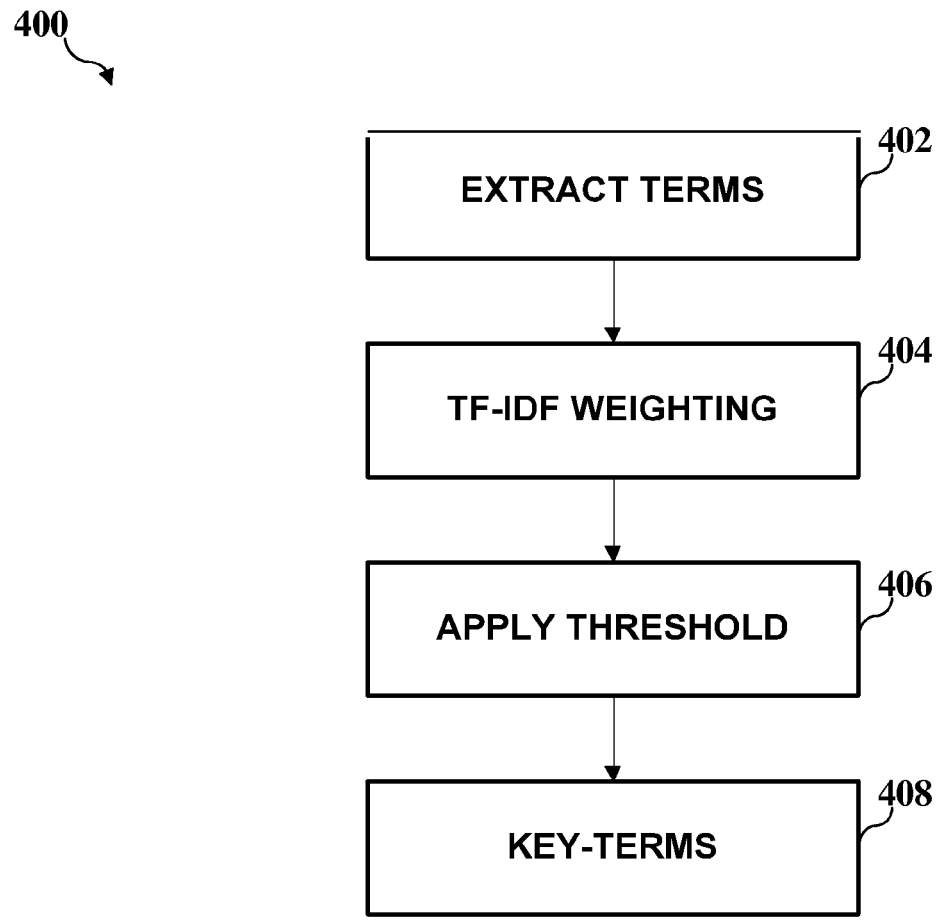
FIG. 4 is a workflow of a method for analyzing phrases in customer interactions in accordance with embodiments of the invention.

Reference is made to FIG. 4, which is a workflow 400 of a method for analyzing phrases in customer interactions in accordance with embodiments of the invention. In one embodiment, workflow 400 may be a sub-task of content analysis operation 308 of FIG. 3.

In operation 402, a content analysis module (e.g., e.g., hardware or software executed by contact center processor 142 of FIG. 1) may identify and extract one or more main terms, such as, topics or phrases that the customer commonly uses in their interactions.

In operation 404, the content analysis module may represent the extracted terms as a weighted model, which may be referred to as a "bag-of-words" (BOW) model, in which the terms are weighted according to an information retrieval measure, such as, a term frequency-inverse document frequency (tf-idf) weight. Other weighted measures may be used to weigh customer profile terms, such as, Kullback-Leibler divergence, mutual information measure, conditional entropy measure, etc.

In operation 406, the weighted values of each term may be compared to a threshold value range.

In operation 408, if the weighted values of the terms fall within the threshold value range, the content analysis module may determine that the weighted terms are keywords that may be used to characterize the content of the customer's interactions.

In other examples, statistical methods, such as, Latent Dirichlet Allocation (LDA), may be used to extract topics from the customer's interactions.

Phrase analysis may also be used to extract customer content information such as:
  Topic distribution—a distribution of topics used by the customer in previous communications with the contact center. Topic distribution may for example include a list of specific topics discussed by the customer and the frequency with which each topic is discussed.
  Linguistic richness—a measure of a level of linguistic proficiency of the customer, for example, determined by variety or vocabulary of words, complexity of word, logical relationships, density of individual thoughts per sentence length, etc. Linguistic richness may be measured, for example, by lexical profiling.
  Temporal topics models—multiple topics models may be used to model topics discussed in different time periods, for example, to distinguish topics of long-term and short-term interest or topics of current and past interest. For example, during interactions, customers may exhibit periodic changes in their interests. Thus, a customer profile may be updated periodically to adjust the profile to reflect such short-term changes, while maintaining the long-term history knowledge about the customer. For example, the long-term profile may represent more general or stable interests of the customer and the short-term profile may represent more specific or current interests. Other temporal profile divisions may be used, for example, including profiles reflecting topics over the past day, week, month, year and/or entire history. In one example, terms or topics that appear in past and current interactions associated with the customer may be aggregated, for example, based on their relative tf-idf scores.

For style analysis, the content analysis module may analyze the characteristic or typical writing style of the customer through their interactions with the contact center. Style features may be extracted by analyzing the grammatical properties of interactions content. Style features may include, for example (other style features may also be used):
  Percent of pronoun usage (e.g., percent of pronouns used out of all words in an interaction).
  Percent of passive usage (e.g., percent of passive phrases used out of all phrases in an interaction, where the passive form may be detected using a list of past-particle verbs).
  Percent of short sentences/utterances (e.g., percent of sentences or utterances in an interaction that include less than a certain predefined number of words).
  Percent of modal auxiliaries or subordinate clauses (e.g., percent of the sentences or utterances in an interaction that include modal auxiliaries or subordinate clauses).

In operation 310, the processor may extract customer data from the customer interaction and search a customer information database 312 (e.g., customer database 212 of FIG. 2)

to find matching identifying information registered to or associated with a contact center customer or account. Identifying information may include a channel-specific identifier associated with each of the contact center's communication channels such as e-mail address, telephone number, IP address, etc. (e.g., identifiers for channels other than the social media channels). Channel-specific identifiers may include identification uniquely associated with a channel, where for example, an e-mail address is unique to an e-mail channel, a telephone number is unique to a telephone channel and an IP address is unique to a web channel. Identifying information may also include personal data identifying the customer, such as, age, primary residence address, gender, occupation, marital status, etc. The processor may use data registered to the customer, e.g., stored in customer information database 312, to augment or replace customer data that is missing or not up to date and may provide a unique system ID associated with the matching customer. In one example, to extract customer data from interactions content, the processor may apply textual analysis, which may comprise linguistic analysis, followed by matching the resulting text to predetermined rules or applying a statistical method. One or more rules may identify or resolve a name, a relation or an event to an entity. A rule may be represented as a pattern of elements and optionally operators applied to the elements. The elements may include strings, lexicons, parts of speech, etc., and the operators may be indicate the distance between two elements or tokens, e.g., "or", "optional", or others.

In operation 314, the processor may generate or receive a profile such as the customer's contact center profile. The customer's profile may be a weighted sum of the customer's content information or a derivation thereof (analyzed in operation 308) and identifying information or a derivation thereof (extracted in operation 310), which may be represented as a vector of features and their associated values and weights. In one example, the customer profile may be defined by a tuple representation of the features, such as, "entity→property:→value." Other data representations may be used. For example, if a customer's name is John Smith, the customer's profile identification information may be represented as "name→first name→John" and "name→last name→Smith" and, for example, if a short-term topics model reveals the customer's interactions include the word "iphone," the customer's profile content information may be represented as "topic→short-term→iphone." Each profile feature may have different weights, each representing the importance or the confidence of each feature. The customer's contact center profile may be stored and used to compare to an author's social media profile to determine if the contact center customer is the same entity as a social media author.

Figure 5:
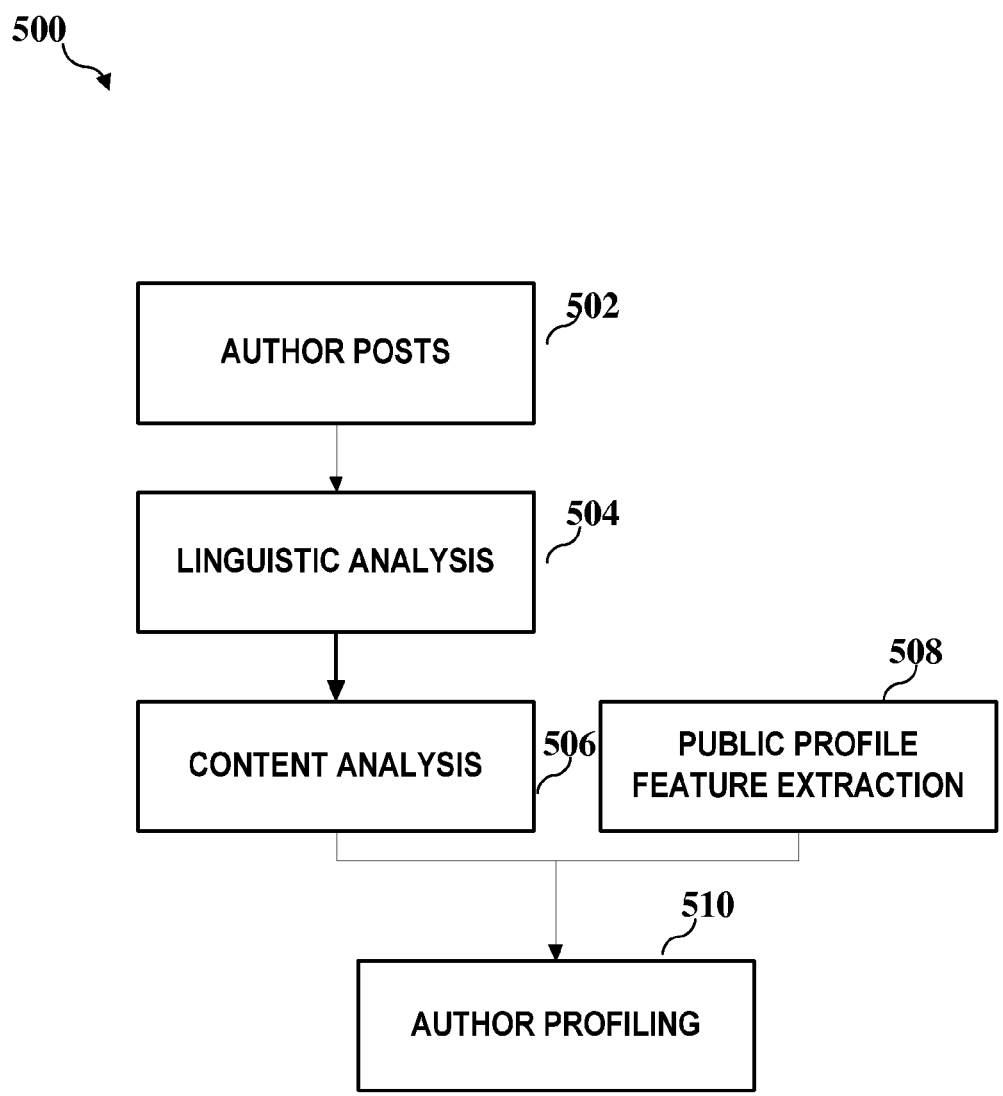
FIG. 5 is a workflow of a method for generating an author's social media profile in accordance with embodiments of the invention.

Reference is made to FIG. 5, which is a workflow 500 of a method for generating an author's social media profile in accordance with embodiments of the invention. In one embodiment, a social media profile (e.g., author profile 220 of FIG. 2) is a collection of data describing a person's use of and/or identity associated with a social media platform or service (e.g., provided by one or more social media servers 122 of FIG. 1).

In operation 502, social media posts or interactions hosted by a social media server (e.g., server 122 of FIG. 1) may be transferred to and/or received by a contact center processor (e.g., processor 142 of FIG. 1), for example, using a public search API provided by the social media server, a third party data provider or directly by a web crawler searching blogs, forums and websites. The posts may be filtered using a search criterion, such as, keyword matching, relevancy to a target company, dates of posts, etc., in order to retrieve posts relevant to the target company or entity. Additional query expansion and disambiguation techniques may be used.

In operation 504, a linguistic analysis module (e.g., hardware or software executed by contact center processor 142 of FIG. 1) may perform linguistic analysis on the social media posts.

In operation 506, a content analysis module (e.g., hardware or software executed by contact center processor 142 of FIG. 1) may analyze the content of the social media posts to extract features that may be used to build the author profile. The content analysis module may include logic or analysis engines to perform tasks, such as, phrase analysis, style analysis and author details extraction.

In operation 508, the contact center processor may retrieve identifying information registered to the author that is publicly available on the social media server, e.g., using a probe (e.g., probe 146 of FIG. 1) that may query the social media server API, or retrieve the information via other public databases. Identifying information may include a channel-specific identifier associated with a social media channel, such as, a Facebook ID unique associated with a Facebook channel, a Twitter ID unique associated with a Twitter channel, etc. and/or other personal data identifying the author, such as, age, primary residence address, gender, occupation, marital status, e-mail address, telephone number, etc. The processor may use the data registered to the author in the social media service to augment or replace the author's data that is missing or not up to date.

In operation 510, the contact center processor may generate or receive the author's social media profile. In other embodiments, the author's social media profile may be previously generated, or received. The author's profile may be represented as a weighted sum of the author's content information (analyzed in operation 506) and identifying information (retrieved in operation 508). The author's profile may be represented as a vector of features and their associated values and weights. In one example, the author's profile may be defined by the following representation of tuples "entity→property→value." For example, if the profile linked to the post lists the name of the author as John Smith, the author's profile may be represented as name→"first name"→John and "name→"last name"→Smith". If only the author's nickname, pseudonym, or user name is available, the profile name may be identified as for example "name→"nick name"→john123". Each profile feature may have different weights representing the importance or the confidence of each feature. Other profile representation methods may be used. In other embodiments, the customer and author data may be compared without using profiles; or their profiles may include any form of their data so that a profile comparison may include any data comparison.

Figure 6:
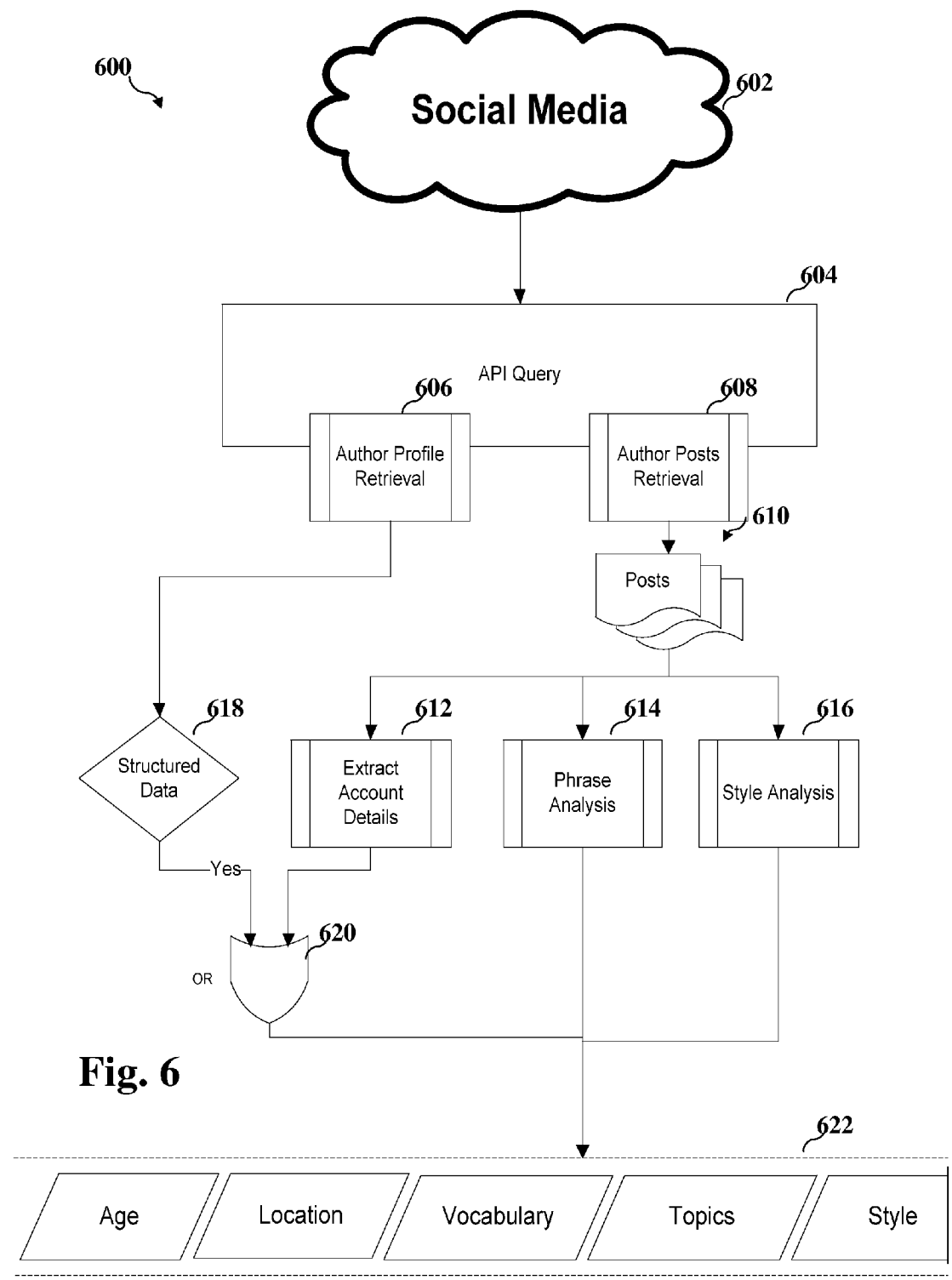
FIG. 6 schematically illustrates data structures used to generate an author's social media profile in accordance with embodiments of the invention.

Reference is made to FIG. 6, which schematically illustrates data structures 600 used in the workflow of FIG. 5 to generate an author's social media profile in accordance with embodiments of the invention.

A probe 604 (e.g., probe 146 of FIG. 1), such as an API query, may be applied to social media data 602 to extract an author's profile 606 and posts 608. The retrieved posts 610 may be analyzed for content, such as, phrase analysis 614 and style analysis 616. Account details 612 may also be extracted from retrieved posts 610 to identify the author. To supplement or replace account details 612 that are missing or not up to date, structured data 618 may be retrieved, e.g., from the social media server (e.g., server 122 of FIG. 1) or another publicly accessible database, defining the author's information registered in the social media environment. Together, the author's content information or derivations or metadata thereof (e.g., phrase analysis 614 and style analysis 616) and identifying/personal information or derivations or metadata thereof (e.g., account details 612 and/or structured data 618) may be used to generate author's profile 622. Author's profile 622 may define both the identity and style/content of the author with parameters, such as, age, location, vocabulary, topics, style, etc. In other embodiments, author's profile 622 may be previously generated, generated using another process, or not used where the actual author's information or derivatives may be used.

Once contact center customer profiles and social media profiles are generated or received (e.g., as shown in workflows 300 and 500 of FIGS. 3 and 5, respectively), the profiles may be compared to determine if the profiles are similar or correlated. Each profile may define values for at least two parameters (e.g., a content parameter and an identification parameter), which may be represented as a vector having values in at least two respective dimensions. To measure the similarity between the social media profile and the contact center profile, a vector similarity, such as, a cosine similarity, may be calculated between the social media profile vector representation and the contact center profile vector representation. Cosine similarity may measure the similarity between the vectors by measuring the cosine of the angle between them. The cosine of a zero angle is 1, and less than 1 for any other angle. The cosine of the angle between the two vectors may therefore be used to determine whether the two vectors similar, e.g., pointing in the same or similar directions, and thus if the associated profiles represent the same entity. The social media and contact center profiles may have other measures of similarity or difference, such as, a weighted Euclidian distance, an arithmetic mean distance and/or a geometric mean distance. To determine whether the profiles are sufficiently close to represent the same identity, the similarity measure or score of the closest matching profiles may be compared to a threshold. Threshold values may be set, for example, in a testing phase, by determining a range of similarity measures for a set of manually matched profiles and setting the threshold range to include that similarity range (e.g., or a distribution thereof, such as the center 90% of the range).

Figure 7:
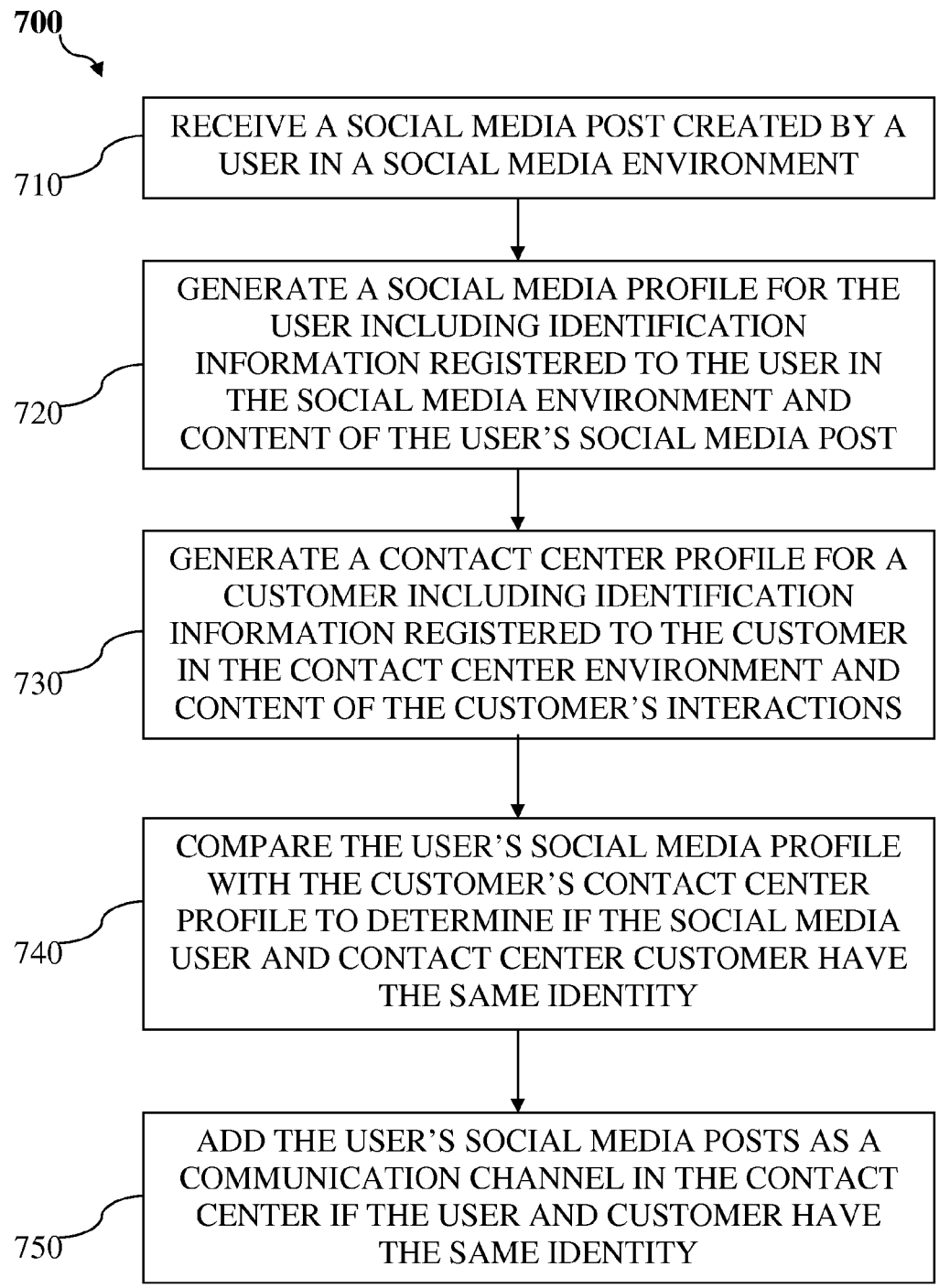
FIG. 7 is a workflow of a method for identifying an author of a social media post in accordance with an embodiment of the invention.

Reference is made to FIG. 7, which is a workflow 700 of a method for identifying an author of a social media post in accordance with an embodiment of the invention.

In operation 710, a processor (e.g., contact center processor 142 of FIG. 1) may receive the social media post or interaction. The post or interaction may be created by a user or author in a social media environment. The post or interaction may be found using a probe (e.g., probe 146 of FIG. 1) searching a social media environment (e.g., social media environment 108 of FIG. 1) for content related to a target entity or company, topic, keywords, etc.

In operation 720, the processor may generate or receive a social media profile for the user including one or more identification parameter defining personal information registered to the user in the social media environment and one or more content parameters defining or describing content of the user's social media post or interaction. Identification parameters may include, for example, first name, last name, age, primary residence address, gender, occupation, marital status, e-mail address, telephone number, etc. Other identification parameters may be used. Content parameters may include, for example, topic, topic distribution, temporal topic models, linguistic richness, sentiment, tone, opinion, style, vocabulary, the presence of certain keywords, average length of sentences, unique phrases, the use of slang or specific slang terms, emoticons, etc. Other content parameters may be used.

In operation 730, for each of a plurality of customers registered in a contact center environment (e.g., contact center environment 110 of FIG. 1), the processor may generate or receive a contact center profile for the customer including one or more identification parameters defining personal information registered to the customer in the contact center environment and one or more content parameters defining or describing the content of the customer's past contact center interactions. The same or different identification parameters and/or content parameters may be used to generate the contact center profile as the social media profile.

In operation 740, the processor may compare the user's social media profile with the customer's contact center profile to determine if the social media user and contact center customer have the same identity, e.g., are the same person. In one embodiment, the profiles may be compared using an equivalence relationship that compares the identification and content parameters of the respective profiles. The resulting equivalence value may be compared to a predetermined threshold defining a range for the equivalence relationship within which the social media user and contact center customer are determined to have the same identity. The predetermined threshold may be set in a testing phase to maximize the accuracy of determining users and customers to be identical that are already known to be identical. Other comparison methods may be used.

In some embodiments, if the social media user is determined to have a different identity than all the contact center customers, the processor may cause the user's social media profile to be stored for a predetermined period of time so that if the user registers as a contact center customer within the predetermined period of time, the processor may retroactively determine their identity.

In one embodiment, each of the user's profile and customer's profile is represented by a vector with identification and content parameters. For example, a vector representing profile may have the form: {name→first_name→John, name→last_name→smith, address→city→Portland, topic→short_term→iphone, topic→short_term→battery, style→short_sentences→0.3, etc.} Each vector may represent the identification and content parameter values of each profile in different dimensions. The vector profiles may be compared by calculating the vector (e.g., cosine) difference between their representative vectors. Other data representations may be used.

In operation 750, if the social media user and contact center customer are determined to have the same identity, the processor may add that user's social media posts as a channel of communication to be monitored by the contact center for the associated customer. Other or different results or uses for a match may be used.

Other operations or orders of operations may be used. For example, although some embodiments of the invention describe first searching for/ filtering posts or other interactions that meet criteria (e.g., related to a target company) and then filtering posts with the same identity as a target customer, alternatively, embodiments of the invention may first filter for posts or other interactions based on a customer search and then based on the criteria or company search.

Embodiments of the invention may analyze social media data based on a general topic analysis, sentiment analysis, opinion mining, and additionally connect each individual post to a previous customer interaction and/or each post's author to an individual customer.

It may be appreciated that "real-time" or "live" operations such as tracking social media interactions may refer to operations that occur instantly, at a small time delay of, for example, between 0.01 and 10 seconds, during the operation or operation session, concurrently, or substantially at the same time as.

It may be appreciated that determining if a value falls within a range includes determining is a value is above a threshold (the value range defined above the threshold), below a threshold (the value range defined below the threshold) or between two or more thresholds (the value range defined between two thresholds or the combination of ranges between multiple pairs of thresholds).

Different embodiments are disclosed herein. Features of certain embodiments may be combined with features of other embodiments; thus certain embodiments may be combinations of features of multiple embodiments.

Embodiments of the invention may include an article such as a computer or processor readable non-transitory storage medium, such as for example a memory, a disk drive, or a USB flash memory encoding, including or storing instructions, e.g., computer-executable instructions, which when executed by a processor or controller, cause the processor or controller to carry out methods disclosed herein.

The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

The invention claimed is:

1. A method for identifying an author of a social media interaction, the method comprising:
receiving a social media profile for a user interacting in a social media interaction in a social media environment, wherein the social media profile includes one or more identification parameters defining personal information registered to the user in the social media environment and one or more content parameters defining content of the user's social media interaction;
for each of a plurality of customers registered in a contact center environment, receiving a contact center profile for the customer including one or more identification parameters defining personal information registered to the customer in the contact center environment and one or more content parameters defining content of the customer's past contact center interactions; and
comparing the user's social media profile with the customer's contact center profile using an equivalence relationship that compares said respective identification parameters and content parameters of the profiles to determine a final equivalence of whether the social media user and contact center customer have the same identity, wherein a predetermined threshold is set to define a range for the equivalence relationship within which the social media user and contact center customer are determined to have the same identity, wherein the predetermined threshold is set in a testing phase to balance maximizing the accuracy and minimizing missed instances of determining users and customers to be identical that are previously known to be identical, wherein each of the user's and customer's profile is represented by a vector with each of the identification and content parameters thereof having values in a respective dimension and wherein the profiles are compared by calculating the vector difference between their representative vectors to measure a similarity between the social media profile and the contact center profile and wherein the content parameters comprise one or more content parameters selected from the group consisting of: linguistic richness, sentiment, tone, opinion, style, vocabulary, average length of sentences, slang and emoticons; and
after determining the final equivalence that the social media user and contact center customer are determined to have the same identity, monitoring that user's social media interactions by the contact center for the associated customer.

2. The method of claim 1, wherein identification parameters comprise one or more identification parameters selected from the group consisting of: first name, last name, age, primary residence address, gender, occupation, marital status, e-mail address and telephone number.

3. The method of claim 1 comprising, if the social media user is determined to have a different identity than all contact center customers, storing the user's social media profile for a predetermined period of time to retroactively determine the identity of the user if the user registers as a contact center customer within the predetermined period of time.

4. The method of claim 1, wherein the equivalence relationship defines a fuzzy comparison between the respective identification parameters and content parameters of the profiles to determine whether or not the social media user and contact center customer match.

5. A method for determining if an author of a social media interaction is one of a plurality of customers for whom identification information is registered, the method comprising:
receiving identification information registered by the author of the social media interaction that is publicly available, wherein the author's received identification information includes a channel-specific identifier associated with a social media channel and the identification information registered for the plurality of customers includes a channel-specific identifier associated with a different communication channel; and
determining a final equivalence of whether the author of the social media interaction is one of the plurality of customers using an equivalence relationship comparing the author's and customer's respective identification information and content information describing the content of the author's social media interaction and content information describing the content of the customer's past interactions, wherein a predetermined threshold is set to define a range for the equivalence relationship within which the author and the customer are determined to have the same identity, wherein the predetermined threshold is set in a testing phase to balance maximizing the accuracy and minimizing missed instances of determining authors and customers to be identical that are previously known to be identical, wherein each of the author's and customer's information is represented by a vector with each of the identification information and content information thereof having values in a respective dimension and wherein the author's and customer's information are compared by calculating the vector difference between their representative vectors to measure a similarity between the author's and customer's information and wherein the content information is selected from the group consisting of: linguistic richness, sentiment, tone, opinion, style, vocabulary, average length of sentences, slang and emoticons; and
after determining the final equivalence that the author of the social media interaction is the associated one of the plurality of customers, monitoring that author's social media interactions by the contact center for the associated customer.

6. The method of claim 5, wherein the plurality of users includes customers registered in a contact center environment.

7. The method of claim 5, wherein the author's publicly available identification information is limited by the author's security settings.

8. The method of claim 5, wherein the social media interaction is obtained by searching a social media provider based on a criterion.

9. A system for identifying an author of a social media interaction, the system comprising:
   a customer information database storing contact center profiles for each customer registered in a contact center environment; and
   a processor configured to:
      receive a social media profile for a user interacting in a social media interaction in a social media environment, wherein the social media profile includes one or more identification parameters defining personal information registered to the user in the social media environment and one or more content parameters defining content of a social media interaction provided by the user,
      for each of a plurality of customers registered in the contact center environment, receive the contact center profile for the customer including one or more identification parameters defining personal information registered to the customer in the contact center environment and one or more content parameters defining content of the customer's past contact center interactions, and
      compare the user's social media profile with the customer's contact center profile using an equivalence relationship that compares said respective identification parameters and content parameters of the profiles to determine a final equivalence of whether the social media user and contact center customer have the same identity, wherein a predetermined threshold is set to define a range for the equivalence relationship within which the social media user and contact center customer are determined to have the same identity, wherein the predetermined threshold is set in a testing phase to balance maximizing the accuracy and minimizing missed instances of determining users and customers to be identical that are previously known to be identical, wherein each of the user's and customer's profile is represented by a vector with each of the identification and content parameters thereof having values in a respective dimension and wherein the processor compares the profiles by calculating the vector difference between their representative vectors to measure a similarity between the social media profile and the contact center profile and wherein the content parameters comprise one or more content parameters selected from the group consisting of: linguistic richness, sentiment, tone, opinion, style, vocabulary, average length of sentences, slang and emoticons; and
      after determining the final equivalence that the social media user and contact center customer are determined to have the same identity, monitor that user's social media interactions by the contact center for the associated customer.

10. The system of claim 9 comprising a probe to extract the user's social media interactions from the social media environment.

11. The system of claim 9, wherein the customer information database is a customer relationship management (CRM) database.

12. The method of claim 1 comprising measuring the linguistic richness based on a level of linguistic proficiency determined by variety or vocabulary of words, complexity of words, logical relationships or density of individual thoughts per sentence length.

13. The method of claim 1 comprising measuring the style based on grammatical properties defined by the usage of one or more features selected from the group consisting of: pronouns, passive utterances, short utterances that include less than a certain predefined number of words, modal auxiliaries and subordinate clauses.

14. The method of claim 1, wherein the content parameters further comprise one or more content parameters selected from the group consisting of: topic, topic distribution and temporal topic models.

15. The method of claim 14 comprising measuring the topic distribution using a distribution of topics of the customer's past interactions.

16. The method of claim 14 comprising measuring the temporal topics models using multiple topics models that model topics discussed in different time periods to distinguish topics of long-term interest discussed previously to a periodic update and short-term interest discussed more recently than a periodic update or topics of current and past interest.

17. The method of claim 1, wherein the content parameters further comprises unique phrases.

18. The method of claim 1, wherein the content parameters further comprises phrase analysis.

19. The method of claim 1 comprising representing each of the user's social media profile and the customer's contact center profile as a weighted sum of the identification parameters and content parameters and wherein said comparing comprises evaluating the equivalence relation between the weighted sum of the user's social media profile and the weighted sum of the customer's contact center profile.

20. The method of claim 5 comprising, if the author is determined to have a different identity than all of the plurality of customers, storing the author's identification information and content information for a predetermined period of time to retroactively determine the identity of the author if the author registers as a customer within the predetermined period of time.

21. The method of claim 5, wherein the equivalence relationship defines a fuzzy comparison between the respective identification parameters and content parameters of the author and customer to determine whether or not the author and customer match.

22. The method of claim 5 comprising measuring the linguistic richness based on a level of linguistic proficiency determined by variety or vocabulary of words, complexity of words, logical relationships or density of individual thoughts per sentence length.

23. The method of claim 5 comprising measuring the style based on grammatical properties defined by the usage of one or more features selected from the group consisting of: pronouns, passive utterances, short utterances that include less than a certain predefined number of words, modal auxiliaries and subordinate clauses.

24. The method of claim 5 comprising representing each of the author's and customer's information as a weighted sum of the identification information and content information and wherein said determining comprises evaluating the equivalence relation between the weighted sum of the author's information and the weighted sum of the customer's information.

25. The system of claim 9, wherein if the social media user is determined to have a different identity than all contact center customers, the processor is configured to store the user's social media profile for a predetermined period of time to retroactively determine the identity of the user if the user registers as a contact center customer within the predetermined period of time.

26. The system of claim 9, wherein the processor is configured to represent each of the user's social media profile and the customer's contact center profile as a weighted sum of the identification parameters and content parameters and wherein the processor is configured to compare by evaluating the equivalence relation between the weighted sum of the user's social media profile and the weighted sum of the customer's contact center profile.

* * * * *